United States Patent
Yoshida et al.

(10) Patent No.: US 8,132,401 B2
(45) Date of Patent: Mar. 13, 2012

(54) EXHAUST PURIFICATION DEVICE OF INTERNAL COMBUSTION ENGINE

(75) Inventors: Kohei Yoshida, Gotenba (JP); Takamitsu Asanuma, Mishima (JP); Hiromasa Nishioka, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 717 days.

(21) Appl. No.: 12/226,608

(22) PCT Filed: Apr. 3, 2008

(86) PCT No.: PCT/JP2008/057045
§ 371 (c)(1), (2), (4) Date: Oct. 23, 2008

(87) PCT Pub. No.: WO2008/123629
PCT Pub. Date: Oct. 16, 2008

(65) Prior Publication Data
US 2010/0146937 A1     Jun. 17, 2010

(30) Foreign Application Priority Data
Apr. 5, 2007     (JP) ................... 2007-099199

(51) Int. Cl.
F01N 3/10 (2006.01)
F01N 3/24 (2006.01)
F01N 3/36 (2006.01)
F02D 45/00 (2006.01)

(52) U.S. Cl. ............... 60/286; 60/285; 60/295; 60/301
(58) Field of Classification Search ............... 60/285, 60/286, 295, 301
See application file for complete search history.

(56) References Cited

U.S. PATENT DOCUMENTS

| 6,502,391 B1 * | 1/2003 | Hirota et al. ............ 60/288 |
| 6,901,750 B2 * | 6/2005 | Toshioka et al. ............ 60/295 |
| 6,988,360 B2 * | 1/2006 | Kimura et al. ............ 60/286 |
| 7,181,904 B2 * | 2/2007 | Yoshida et al. ............ 60/285 |
| 2006/0064969 A1 | 3/2006 | Yoshida et al. |

FOREIGN PATENT DOCUMENTS

| EP | 1 659 270 A1 | 5/2006 |
| JP | A-2000-234512 | 8/2000 |
| JP | A-2003-120392 | 4/2003 |
| JP | A-2004-092524 | 3/2004 |
| JP | A-2005-133610 | 5/2005 |
| JP | A-2006-144624 | 6/2006 |

OTHER PUBLICATIONS

Extended European Search Report dated Jul. 30, 2010 issued in European Patent Application No. EP 08 74 0147.

* cited by examiner

Primary Examiner — Kenneth Bomberg
Assistant Examiner — Jorge Leon, Jr.
(74) Attorney, Agent, or Firm — Oliff & Berridge, PLC

(57) ABSTRACT

An internal combustion engine wherein an $SO_x$ trap catalyst (12), an $NO_x$ storage catalyst (14), and a fuel addition valve (15) are arranged in an engine exhaust passage. When making the air-fuel ratio of the exhaust gas flowing into the $NO_x$ storage catalyst (14) the stoichiometric air-fuel ratio or rich so as to make the $NO_x$ storage catalyst (14) release $NO_x$, additional fuel is supplied into the combustion chamber (2) and fuel is added from the fuel addition valve (15). At this time, the amount of additional fuel to the combustion chamber (2) is controlled so that the air-fuel ratio of the exhaust gas exhausted from the combustion chamber (2) becomes the smallest in the range where the $SO_x$ trap catalyst (12) does not release $SO_x$.

7 Claims, 8 Drawing Sheets

(A)

(B)

(A)

(B)

(A)

(B)

(A)

(B)

EXHAUST PURIFICATION DEVICE OF INTERNAL COMBUSTION ENGINE

TECHNICAL FIELD

The present invention relates to an exhaust purification device of an internal combustion engine.

BACKGROUND ART

Known in the art is an internal combustion engine arranging in an engine exhaust passage an $NO_x$ storage catalyst storing $NO_x$ contained in the exhaust gas when the air-fuel ratio of the inflowing exhaust gas is lean and releasing the stored $NO_x$ when the air-fuel ratio of the inflowing exhaust gas becomes the stoichiometric air-fuel ratio or rich, arranging a fuel addition valve in the engine exhaust passage upstream of the $NO_x$ storage catalyst, and using a combination of several temperature raising means such as the supply of additional fuel into the combustion chamber or the addition of fuel from the fuel addition valve so that the $NO_x$ storage catalyst is raised in temperature most suitably when raising the temperature of the $NO_x$ storage catalyst (see Japanese Patent Publication (A) No. 2003-120392).

In this regard, when making the air-fuel ratio of the exhaust gas flowing into the $NO_x$ storage catalyst rich so as to make the $NO_x$ storage catalyst release the $NO_x$, supplying additional fuel into the combustion chamber so as to make the air-fuel ratio of the exhaust gas rich, compared with adding fuel from the fuel addition valve to make the air-fuel ratio of the exhaust gas rich, results in the oxygen concentration of the exhaust gas as a whole falling, so $NO_x$ being released from the $NO_x$ purification catalyst and reduced better. Therefore, to make the $NO_x$ purification catalyst release the $NO_x$, it is desirable to make the air-fuel ratio of the exhaust gas smaller by additional fuel supplied into the combustion chamber.

On the other hand, when arranging an $SO_x$ trap catalyst able to trap the $SO_x$ contained in the exhaust gas upstream of the $NO_x$ storage catalyst, this $SO_x$ trap catalyst prevents the flow of $SO_x$ into the $NO_x$ storage catalyst. When using such an $SO_x$ trap catalyst, it is necessary to avoid the $SO_x$ trap catalyst releasing $SO_x$ as much as possible, but depending on the air-fuel ratio of the exhaust gas flowing into the $SO_x$ trap catalyst, there is a danger that $SO_x$ will be released. In this case, in the same way as an $NO_x$ storage catalyst, in an $SO_x$ trap catalyst as well, the supply of additional fuel into the combustion chamber enables $SO_x$ to be released easier than the addition of fuel from the fuel addition valve.

Therefore, to simultaneously achieve both a good action of release of $NO_x$ from the NO storage catalyst and prevention of release of $SO_x$ from the $SO_x$ trap catalyst, it is desirable to supply additional fuel into the combustion chamber and add the insufficient amount of fuel from the fuel addition valve so that the air-fuel ratio of the exhaust gas exhausted from the combustion chamber becomes the smallest in the range where the $SO_x$ trap catalyst does not release $SO_x$.

DISCLOSURE OF THE INVENTION

An object of the present invention is to provide an exhaust purification device of an internal combustion engine able to prevent the release of $SO_x$ from an $SO_x$ trap catalyst while making the $NO_x$ storage catalyst release $NO_x$ well.

According to the present invention, there is provided an exhaust purification device of an internal combustion engine arranging in an engine exhaust passage an $SO_x$ trap catalyst able to trap $SO_x$ contained in exhaust gas and arranging in the exhaust passage downstream of the $SO_x$ trap catalyst an $NO_x$ storage catalyst storing $NO_x$ contained in the exhaust gas when an air-fuel ratio of an inflowing exhaust gas is lean and releasing a stored $NO_x$ when the air-fuel ratio of the inflowing exhaust gas becomes the stoichiometric air-fuel ratio or rich, wherein a fuel addition valve for adding fuel is arranged in the engine exhaust passage upstream of the $NO_x$ storage catalyst, and when making the air-fuel ratio of the exhaust gas flowing into the NO storage catalyst the stoichiometric air-fuel ratio or rich to make the $NO_x$ storage catalyst release the $NO_x$, an additional fuel is fed into the combustion chamber and a fuel is added from the fuel addition valve, and at this time, the amount of additional fuel to the combustion chamber and the amount of added fuel from the fuel addition valve are controlled so that the air-fuel ratio of the exhaust gas exhausted from the combustion chamber becomes the smallest in the range where the $SO_x$ trap catalyst does not release $SO_x$.

BEST MODE FOR CARRYING OUT THE INVENTION

Figure 1:
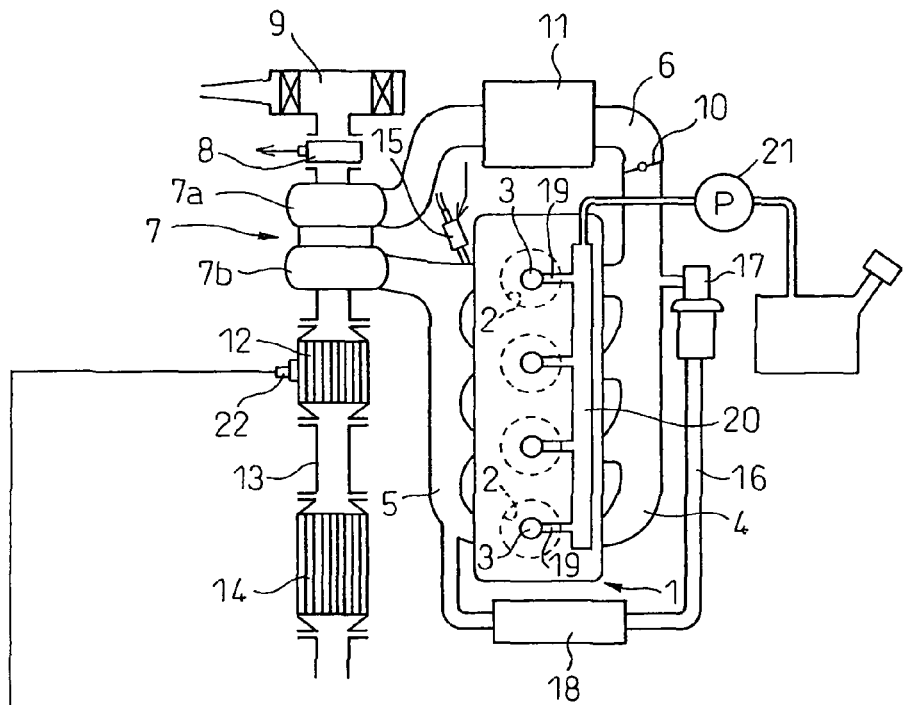
FIG. 1 is an overview of a compression ignition type internal combustion engine.
Figure 1:
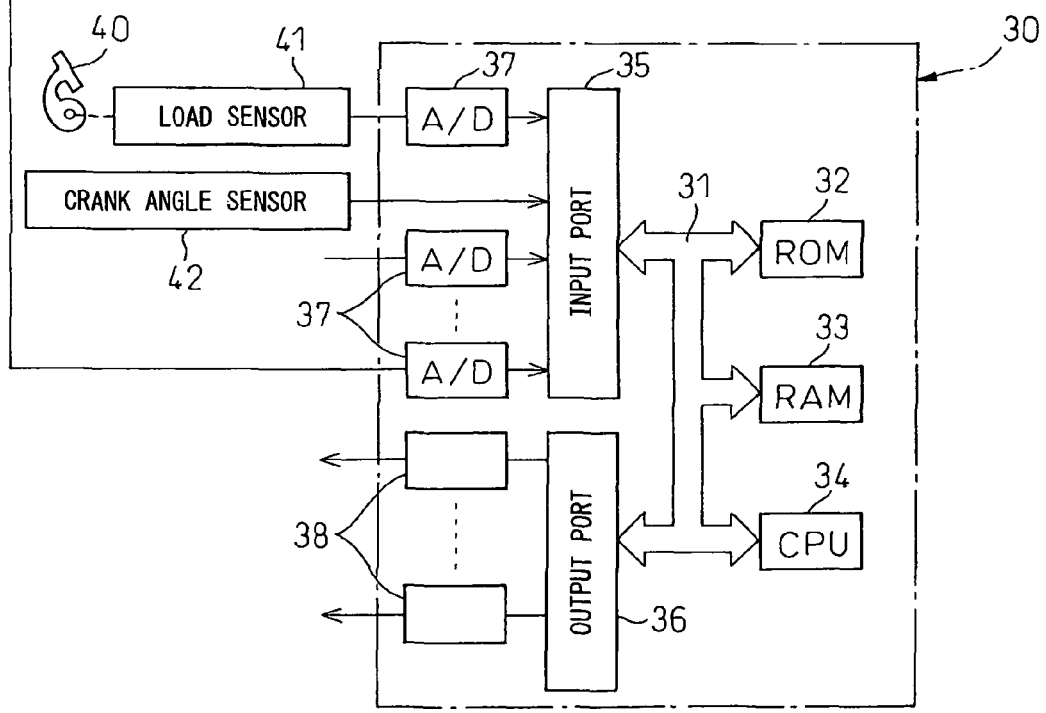

FIG. 1 is an overview of a compression ignition type internal combustion engine.

Referring to FIG. 1, 1 indicates an engine body, 2a combustion chamber of each cylinder, 3 an electronically controlled fuel injector injecting fuel into each combustion chamber 2, 4 an intake manifold, and 5 an exhaust manifold. The intake manifold 4 is connected through an intake duct 6 to a compressor 7a of an exhaust turbocharger 7, while an inlet of the compressor 7a is connected through an intake air detector 8 to an air cleaner 9. Inside the intake duct 6, a throttle valve 10 driven by the step motor is arranged. Further, around the intake duct 6, a cooling device 11 for cooling the intake air flowing through the intake duct 6 is arranged. In the embodiment shown in FIG. 1, the engine cooling water is led into the cooling device 11 where the engine cooling water is used to cool the intake air.

On the other hand, the exhaust manifold 5 is connected to the inlet of an exhaust turbine 7b of the exhaust turbocharger 7, and the outlet of the exhaust turbine 7b is connected to the inlet of an $SO_x$ trap catalyst 12. In addition, the outlet of the $SO_x$ trap catalyst 12 is connected to the $NO_x$ storage catalyst 14 via an exhaust pipe 13. Further, inside the exhaust manifold 5, a fuel feed valve 15 for feeding fuel into the exhaust gas flowing in the exhaust manifold 5 is attached.

The exhaust manifold 5 and intake manifold 4 are connected to each other through an exhaust gas recirculation (hereinafter referred to as "EGR") passage 16. Inside the EGR passage 16, an electronic control type EGR control valve 17 is arranged. Further, around the EGR passage 16, a cooling device 18 for cooling the EGR gas flowing through the EGR passage 16 is arranged. In the embodiment shown in FIG. 1, engine cooling water is led to the cooling device 18 where the engine cooling water cools the EGR gas. On the other hand, each fuel injector 3 is connected through a fuel tube 19 to a common rail 20. This common rail 20 is fed with fuel from an electronically controlled variable discharge fuel pump 21. The fuel fed into the common rail 20 is fed through each fuel tube 19 into a fuel injector 3.

The electronic control unit 30 is comprised of a digital computer and is provided with a ROM (read only memory) 32, RAM (random access memory) 33, CPU (microprocessor) 34, input port 35, and output port 36 which are connect to each other by a bi-directional bus 31. A temperature sensor 22 for detecting the temperature of the $SO_x$ trap catalyst 12 is attached to the $SO_x$ trap catalyst 12, and the output signal of the temperature sensor 22 is input through the corresponding AD converter 37 to the input port 35. In addition, the accelerator pedal 40 is connected to a load sensor 41 generating an output voltage proportional to the amount of depression L of an accelerator pedal 40. The output voltage of the load sensor 41 is input through the corresponding AD converter 37 to the input port 35. Further, the input port 35 is connected to a crank angle sensor 42 generating an output pulse each time the crankshaft rotates by for example 15°. On the other hand, the output port 36 is connected through corresponding drive circuits 38 to the fuel injector 3, the step motor for driving the throttle valve 10, fuel feed valve 15, EGR control valve 17.

Figure 2:
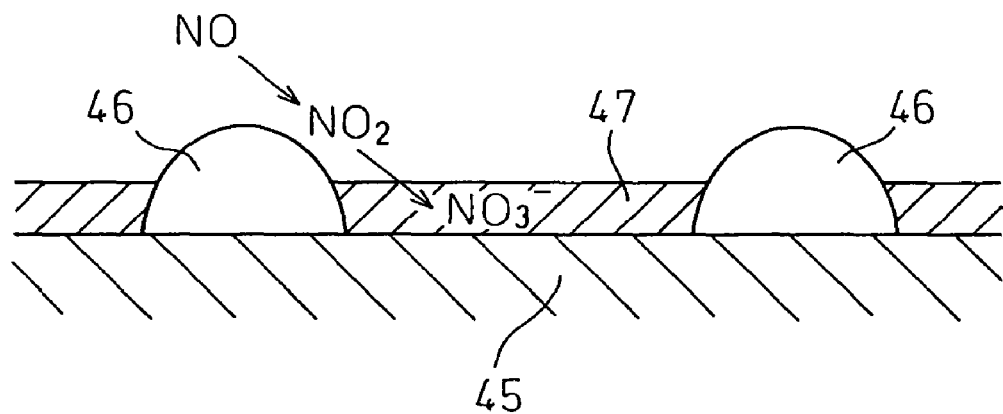
FIG. 2 is a cross-sectional view of the surface part of a catalyst carrier of an NO storage catalyst.

Initially, the $NO_X$ storage catalyst 14 shown in FIG. 1 will be explained. This $NO_X$ storage catalyst 14 is comprised of a substrate on which for example a catalyst carrier comprised of alumina is carried. FIG. 2 illustrates the cross-section of the surface part of this catalyst carrier. As shown in FIG. 2, the catalyst carrier 45 carries a precious metal catalyst 46 diffused on the surface. Further, the catalyst carrier 45 is formed with a layer of an $NO_X$ absorbent 47 on its surface.

In the embodiment according to the present invention, as the precious metal catalyst 46, platinum Pt is used. As the ingredient forming the $NO_X$ absorbent 47, for example, at least one element selected from potassium K, sodium Na, cesium Cs, and other such alkali metals, barium Ba, calcium Ca, and other such alkaline earth metals, lanthanum La, yttrium Y, and other rare earth metals are used.

If the ratio of the air and fuel (hydrocarbons) fed into the engine intake passage, combustion chamber 2, and exhaust passage upstream of the $NO_x$ storage catalyst 14 is called the "air-fuel ratio of the exhaust gas", an $NO_x$ absorption and release action such that the $NO_x$ absorbent 47 absorbs the $NO_x$ when the air-fuel ratio of the exhaust gas is lean and releases the absorbed $NO_x$ when the oxygen concentration in the exhaust gas falls is performed.

That is, explaining this taking as an example the case of using barium Ba as the ingredient forming the $NO_x$ absorbent 47, when the air-fuel ratio of the exhaust gas is lean, that is, the oxygen concentration in the exhaust gas is high, the NO contained in the exhaust gas, as shown in FIG. 2, is oxidized on the platinum Pt 46 to become $NO_2$, next is absorbed in the $NO_x$ absorbent 47 and bonds with the barium oxide BaO to diffuse in the form of nitrate ions $NO_3^-$ into the $NO_x$ absorbent 47. In this way, $NO_x$ is absorbed in the $NO_x$ absorbent 47. So long as the oxygen concentration in the exhaust gas is high, $NO_2$ is formed on the platinum Pt 46. So long as the $NO_x$ absorbent 47 is not saturated in $NO_x$ absorption ability, $NO_2$ is absorbed in the $NO_x$ absorbent 47 and nitrate ions $NO_3^-$ are formed.

As opposed to this, if the exhaust gas is made a rich air-fuel ratio or stoichiometric air-fuel ratio, the oxygen concentration in the exhaust gas falls, so the reaction proceeds in the reverse direction ($NO_3^- \rightarrow NO_2$) therefore the nitrate ions $NO_3^-$ in the $NO_x$ absorbent 47 are released in the form of $NO_2$ from the $NO_x$ absorbent 47. Next, the released $NO_x$ is reduced by the unburned HC and CO contained in the exhaust gas.

In this way, when the air-fuel ratio of the exhaust gas is lean, that is, when burning the fuel under a lean air-fuel ratio, the $NO_x$ in the exhaust gas is absorbed in the $NO_x$ absorbent 47. However, when the fuel continues to be burned under a lean air-fuel ratio, the $NO_x$ absorbent 47 eventually ends up becoming saturated in $NO_x$ absorption ability, therefore the $NO_x$ absorbent 47 ends up becoming unable to absorb the $NO_x$. Therefore, in this embodiment of the present invention, before the $NO_x$ absorbent 47 becomes saturated in absorption ability, additional fuel is fed into the combustion chamber 2 and the fuel is fed from the fuel feed valve 15 to make the exhaust gas temporarily rich air-fuel ratio and thereby make the $NO_x$ absorbent 47 release the $NO_x$.

On the other hand, the exhaust gas contains $SO_x$, that is, $SO_2$. If this $SO_2$ flows into the $NO_x$ storage catalyst 14, this $SO_2$ is oxidized on the platinum Pt 46 and becomes $SO_3$. Next, this $SO_3$ is absorbed in the $NO_x$ absorbent 47, bonds with the barium oxide BaO, is diffused in the form of sulfate ions $SO_4^{2-}$ in the $NO_x$ absorbent 47, and forms stable sulfate $BaSO_4$. However, the $NO_x$ absorbent 47 has a strong basicity, so this sulfate $BaSO_4$ is stable and hard to break down. If just making the exhaust gas rich air-fuel ratio, the sulfate $BaSO_4$ remains as is without breaking down. Therefore, in the $NO_x$ absorbent 47 the sulfate $BaSO_4$ increases along with the elapse of time, therefore the $NO_x$ amount which the $NO_x$ absorbent 47 can absorb falls along with the elapse of time.

In this regard, in this case, if making the air-fuel ratio of the exhaust gas flowing into the $NO_x$ storage catalyst 14 rich in the state where the temperature of the $NO_x$ storage catalyst 14 is made to rise to the $SO_x$ release temperature of 600° C. or more, the $NO_x$ absorbent 47 releases $SO_x$. However, in this case, the $NO_x$ absorbent 47 only releases a little $SO_x$ at a time. Therefore, to make the $NO_x$ absorbent 47 release all of the absorbed $SO_x$, it is necessary to make the air-fuel ratio rich over a long time, therefore there is the problem that a large amount of fuel or reducing agent becomes necessary.

Therefore, in an embodiment of the present invention, the $SO_x$ trap catalyst 12 is arranged upstream of the $NO_x$ storage catalyst 14 to trap the $SO_x$ contained in the exhaust gas by this $SO_x$ trap catalyst 12 and thereby prevent $SO_x$ from flowing into the $NO_x$ storage catalyst 14. Next this $SO_x$ trap catalyst 12 will be explained.

This $SO_x$ trap catalyst 12 is comprised of a monolithic catalyst having a honeycomb construction and has a plurality of exhaust gas flow passages extending straight in the axial direction of the $SO_x$ trap catalyst 12.

Figure 3:
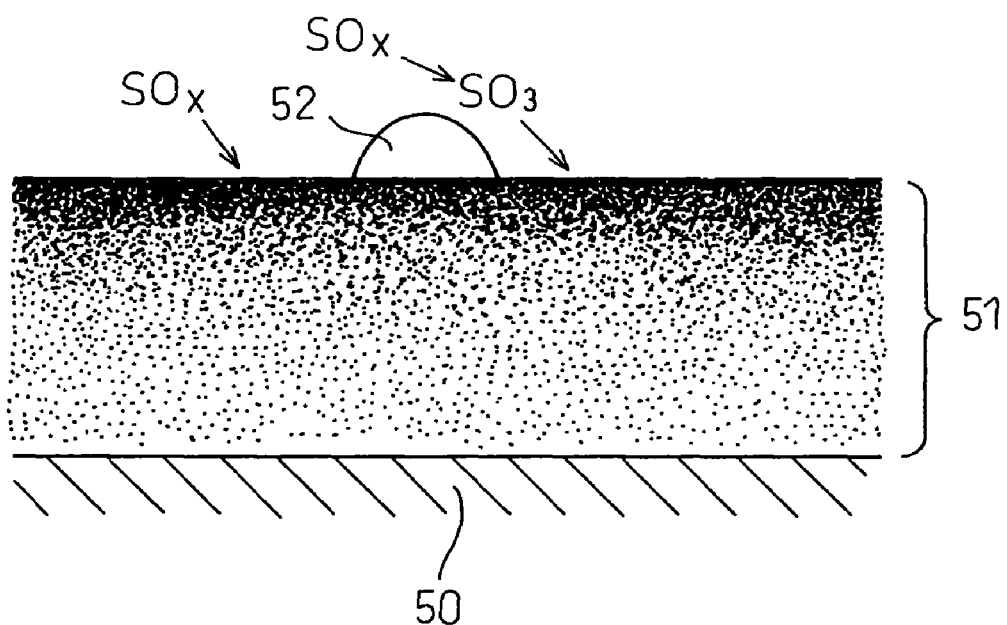
FIG. 3 is a cross-sectional view of the surface part of a substrate of an $SO_x$ trap catalyst.

FIG. 3 illustrates the cross-section of the surface part of a substrate 50 of this $SO_x$ trap catalyst 12. As shown in FIG. 3, the substrate 50 is formed with a coat layer 51 on its surface. This coat layer 51 carries a precious metal catalyst 52 diffused on its surface.

In the embodiment according to the present invention, as the precious metal catalyst 52, platinum is used. As the ingredient forming the coat layer 51, for example, at least one element selected from potassium K, sodium Na, cesium Cs, and other such alkali metals, barium Ba, calcium Ca, and other such alkaline earth metals, lanthanum La, yttrium Y, and other rare earth metals are used. That is, the coat layer 51 of the $SO_x$ trap catalyst 12 exhibits a strong basicity.

Now, the $SO_x$ contained in the exhaust gas, that is, $SO_2$, is oxidized on the platinum Pt 52 as shown in FIG. 3, then is trapped in the coat layer 51. That is, the $SO_2$ diffuses in the form of sulfate ions $SO_4^{2-}$ in the coat layer 51 to form a sulfate. Note that as explained above, the coat layer 51 exhibits a strong basicity. Therefore, as shown in FIG. 3, part of the $SO_2$ contained in the exhaust gas is directly trapped in the coat layer 51.

In FIG. 3, the shading in the coat layer 51 shows the concentration of the trapped $SO_x$. As will be understood from FIG. 3, the $SO_x$ concentration in the coat layer 51 is highest near the surface of the coat layer 51. The further in, the lower it becomes. If the $SO_x$ concentration near the surface of the coat layer 51 increases, the surface of the coat layer 51 weakens in basicity and the $SO_x$ trap ability weakens. Here, if the ratio of the amount of the $SO_x$ trapped in the $SO_x$ trap catalyst 12 to the amount of the $SO_x$ in the exhaust gas is called the "$SO_x$ trap rate", if the basicity of the surface of the coat layer 51 is weakened, the $SO_x$ trap rate falls along with that. In the embodiment according to the present invention, when the $SO_x$ trap rate becomes lower than a predetermined rate, the temperature of the $SO_x$ trap catalyst 12 is made to rise under a lean air-fuel ratio of the exhaust gas by temperature raising control and thereby the $SO_x$ trap ability is restored.

That is, if making the $SO_x$ trap catalyst 12 rise in temperature under a lean air-fuel ratio of the exhaust gas, the $SO_x$ present concentrated near the surface of the coat layer 51 diffuses toward the deep part of the coat layer 51 so that the $SO_x$ concentration in the coat layer 51 becomes uniform. That is, the nitrate produced in the coat layer 51 changes from an unstable state where it concentrates near the surface of the coat layer 51 to the stable state where it diffuses uniformly in the coat layer 51 as a whole. If the $SO_x$ present near the surface of the coat layer 51 diffuses toward the deep part of the coat layer 51, the $SO_x$ concentration near the surface of the coat layer 51 falls, therefore when control for raising the temperature of the $SO_x$ trap catalyst 17 ends, the $SO_x$ trap ability is restored.

Now, as explained above, in the embodiment according to the present invention, when $NO_x$ should be released from the $NO_x$ storage catalyst 14, additional fuel is supplied to the combustion chamber 2 and fuel is added from the fuel addition valve 15. In this case, the additional fuel supplied into the combustion chamber 2 actively reacts with the oxygen and consumes oxygen, so when additional fuel is supplied into the combustion chamber 2, the oxygen concentration in the exhaust gas exhausted from the inside of the combustion chamber 2 falls throughout the exhaust gas. As opposed to this, the fuel added from the fuel addition valve 15 does not completely immediately react with the oxygen in the exhaust gas and consume it, so the action of this added fuel in reducing the oxygen concentration of the exhaust gas as a whole compared with the additional fuel to the combustion chamber 2 is weak.

On the other hand, when the oxygen concentration of the exhaust gas falls as a whole, $NO_x$ is released well from the $NO_x$ storage catalyst 14. Therefore, when seen from the release of $NO_x$ from the $NO_x$ storage catalyst 14, it is desirable to supply additional fuel into the combustion chamber 2 so as to make the air-fuel ratio of the exhaust gas flowing into the $NO_x$ storage catalyst 14 rich. However, if making the air-fuel ratio of the exhaust gas flowing into the $NO_x$ storage catalyst 14 rich by just supplying additional fuel into the combustion chamber 2 in this way, there is a danger of the $SO_x$ trap catalyst 12 releasing $SO_x$.

Nevertheless, to make the $NO_x$ storage catalyst 14 release the $NO_x$ well, it is desirable to make the air-fuel ratio of the exhaust gas flowing into the $NO_x$ storage catalyst 14 as small as possible by the additional fuel supplied into the combustion chamber 2. Therefore, in the present invention, when making the air-fuel ratio of the exhaust gas flowing into the $NO_x$ storage catalyst 14 rich so as to release the NO from the $NO_x$ storage catalyst 14, the amount of additional fuel to the combustion chamber 2 is controlled so that the air-fuel ratio of the exhaust gas exhausted from the combustion chamber 2 becomes the smallest in the range where the $SO_x$ trap catalyst 12 does not release $SO_x$. Further, at this time, the insufficient amount of the fuel required for reducing the $NO_x$ released from the $NO_x$ storage catalyst 14 is added from the fuel addition valve 15.

Figure 4:
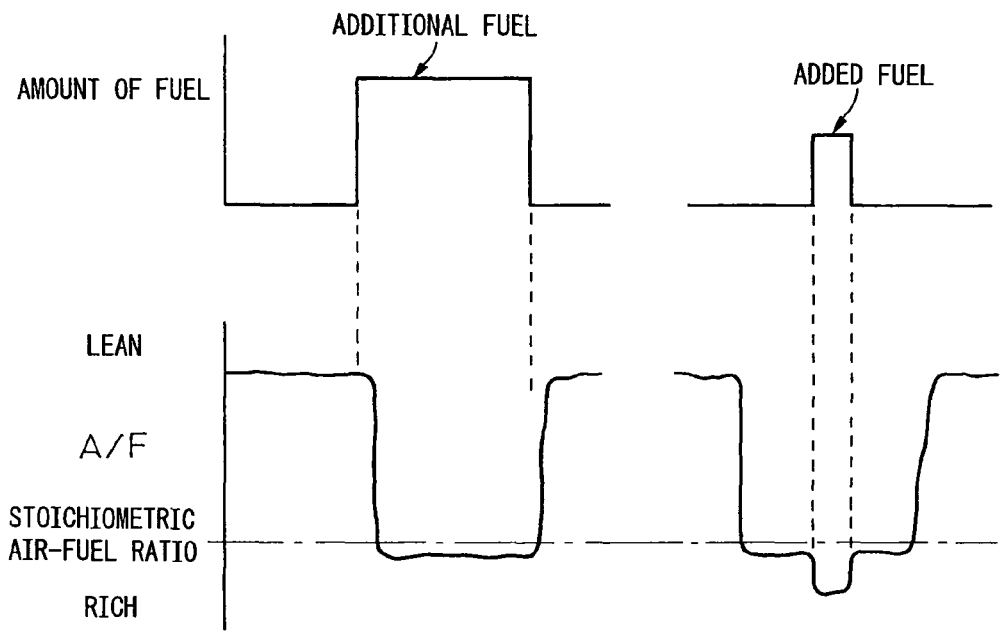
FIG. 4 is a view showing an example of supply of additional fuel and added fuel.
Figure 4:
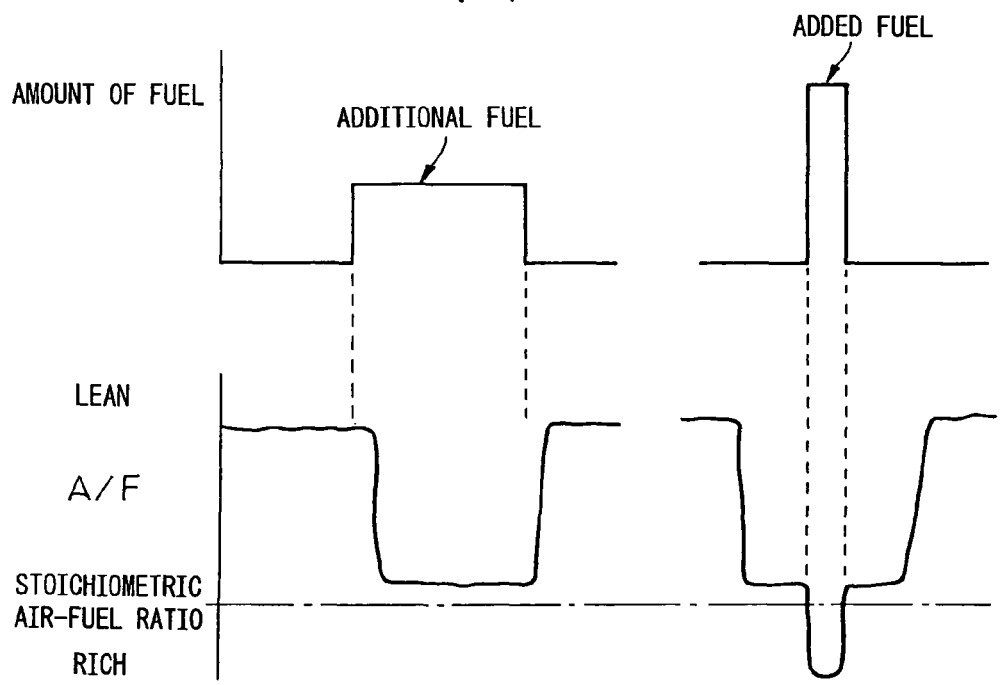

FIGS. 4(A) and (B) show typical examples of supply of additional fuel to the combustion chamber 2 and added fuel from the fuel addition valve 15. FIG. 4(A) shows the case where the air-fuel ratio of the exhaust gas exhausted from the combustion chamber 2 due to the additional fuel to the combustion chamber 2 is made rich. When the exhaust gas made this rich air-fuel ratio reaches the fuel addition valve 15, fuel is added from the fuel addition valve 15. Due to this added fuel, the air-fuel ratio of the exhaust gas is made further richer.

On the other hand, FIG. 4(B) shows the case where the air-fuel ratio of the exhaust gas exhausted from the combustion chamber 2 is reduced to a lean air-fuel ratio near the stoichiometric air-fuel ratio. In this case, compared with the case shown in FIG. 4(A), the amount of added fuel is increased. By the supply of the added fuel, the air-fuel ratio of the exhaust gas is made rich.

Figure 5:
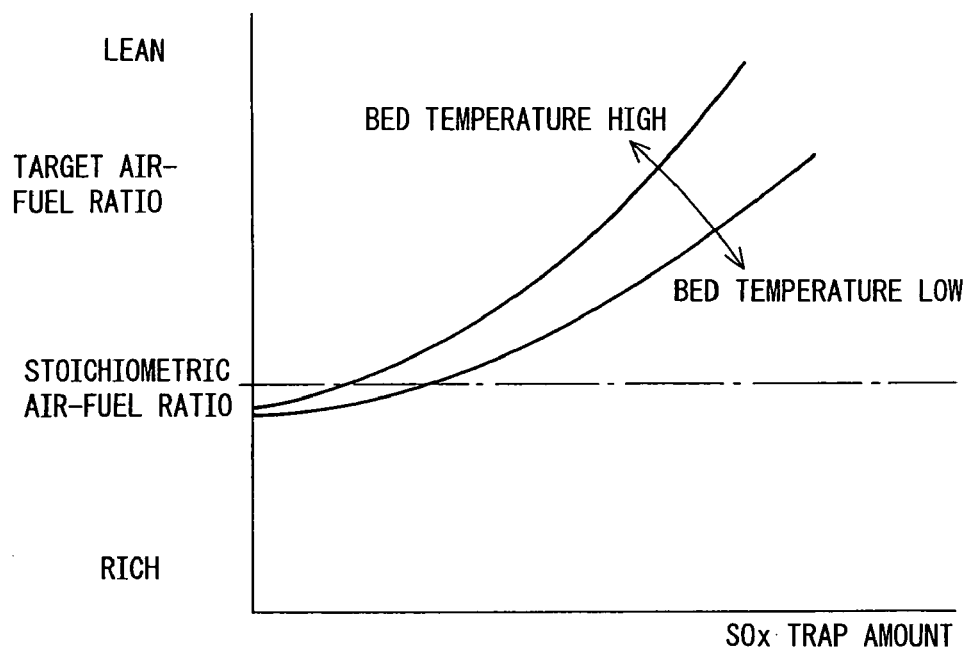
FIG. 5 is a view showing the target air-fuel ratio of the exhaust gas exhausted from the combustion chamber etc.
Figure 5:
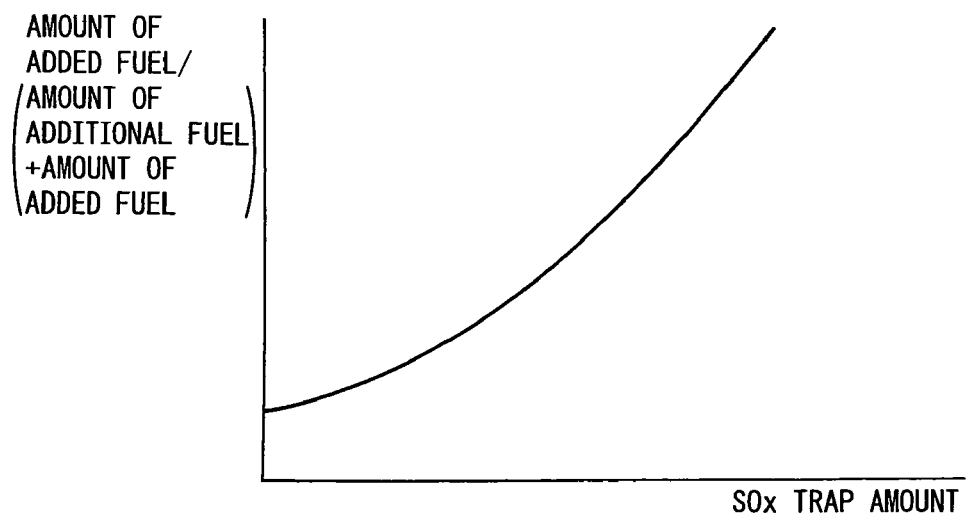

FIG. 5(A), as shown in FIG. 1, shows the relationship between the target air-fuel ratio of the exhaust gas exhausted from the combustion chamber 2 and the $SO_x$ trap amount of the $SO_x$ trap catalyst 12 at the time of release of $NO_x$ in the case where the fuel addition valve 15 is arranged upstream of the $SO_x$ trap catalyst 12. Note that the target air-fuel ratio of the exhaust gas is made the smallest air-fuel ratio of the exhaust gas in the range where the $SO_x$ trap catalyst 12 does not release $SO_x$. At the time of $NO_x$ release control, additional fuel is supplied into the combustion chamber 2 so that the air-fuel ratio of the exhaust gas exhausted from the combustion chamber 2 becomes this target air-fuel ratio.

As will be understood from FIG. 5(A), when the $SO_x$ trap amount is small, the target air-fuel ratio is made slightly rich. That is, when the $SO_x$ trap amount is small, even if the air-fuel ratio of the exhaust gas exhausted from the combustion chamber 2 is made just slightly rich, $SO_x$ is not released from the $SO_x$ trap catalyst 12. On the other hand, if the $SO_x$ trap amount increases, $SO_x$ becomes more easily released from the $SO_x$ trap catalyst 12. Further, if the bed temperature of the $SO_x$ trap catalyst 12 becomes higher, $SO_x$ becomes more easily released from the $SO_x$ trap catalyst 12.

Therefore, in this embodiment according to the present invention, the target air-fuel ratio is made larger the greater the $SO_x$ trap amount of the $SO_x$ trap catalyst 12 and the target air-fuel ratio is made larger the higher the temperature the $SO_x$ trap catalyst 12 becomes.

Further, if the target air-fuel ratio becomes larger at the time of release of $NO_x$, the amount of fuel added from the fuel addition valve 15 is increased so that the air-fuel ratio of the exhaust gas flowing into the $NO_x$ storage catalyst 14 becomes rich. Therefore, as shown in FIG. 5(B), as the $SO_x$ trap amount of the $SO_x$ trap catalyst 12 increases, the ratio of the amount of added fuel to the sum of the amount of additional fuel and the amount of added fuel is increased.

Figure 6:
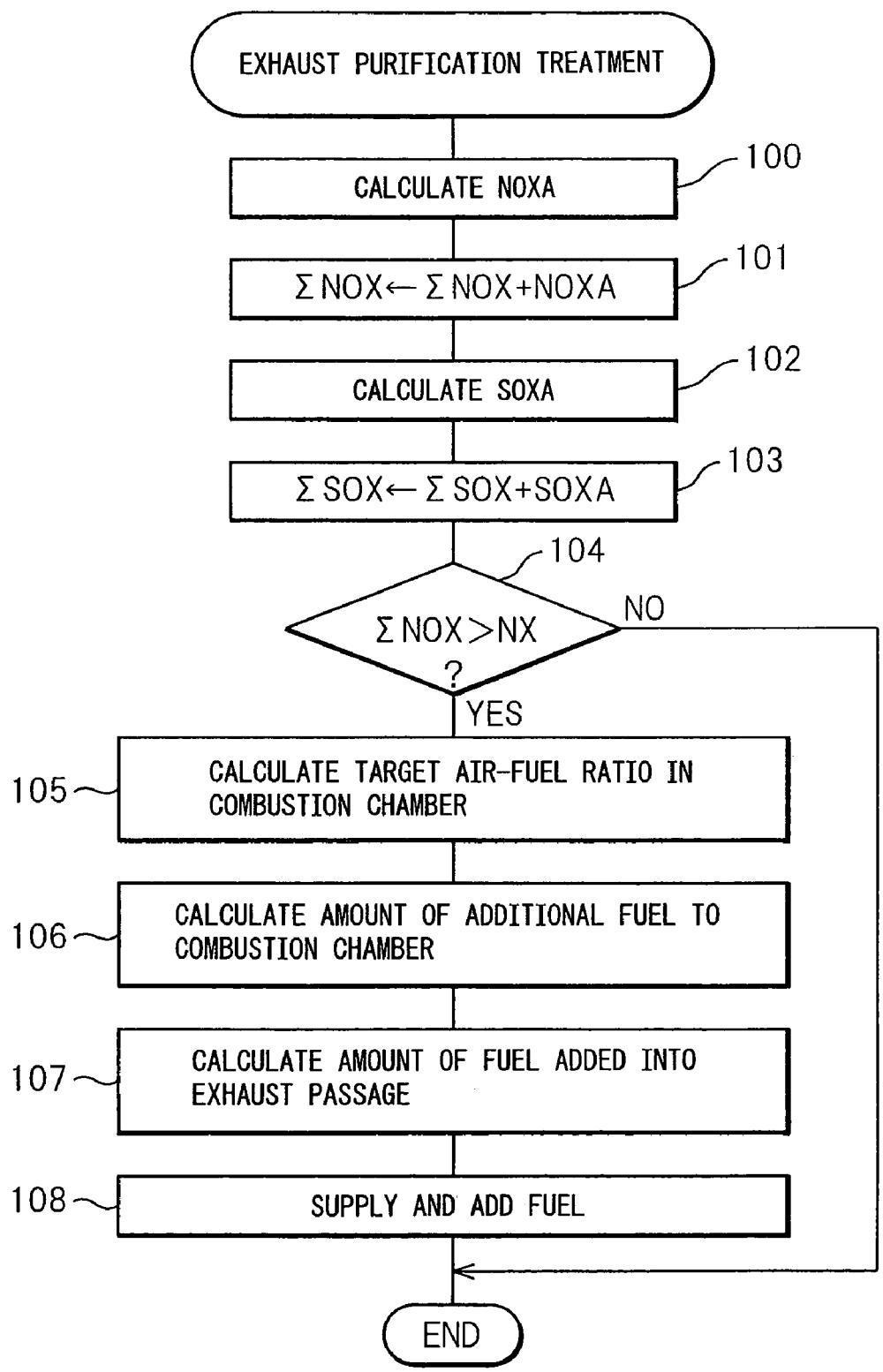
FIG. 6 is a flow chart for exhaust purification treatment.

FIG. 6 shows the exhaust purification treatment routine.

Figure 7:
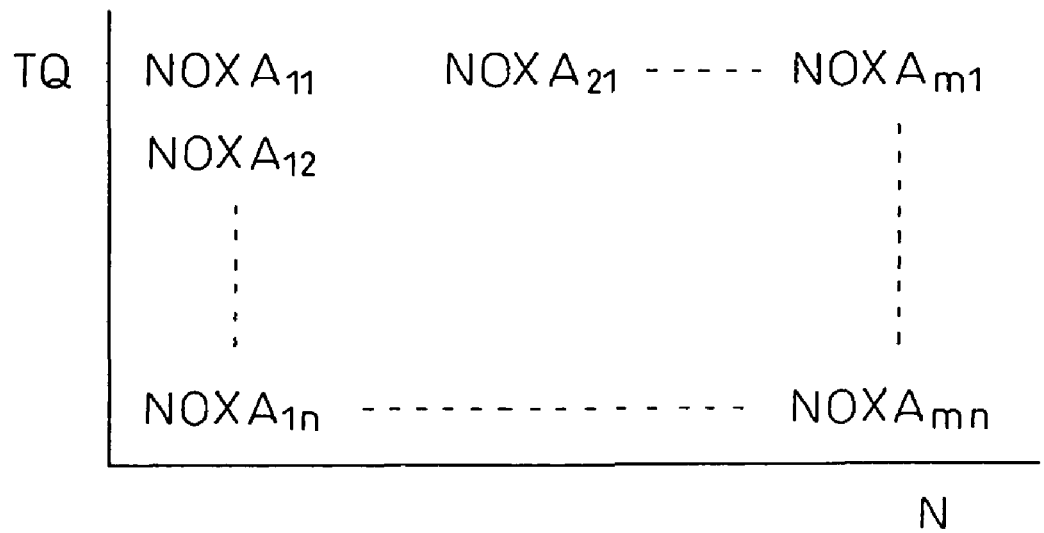
FIG. 7 is a view showing a map of a stored $NO_x$ amount NOXA etc.
Figure 7:
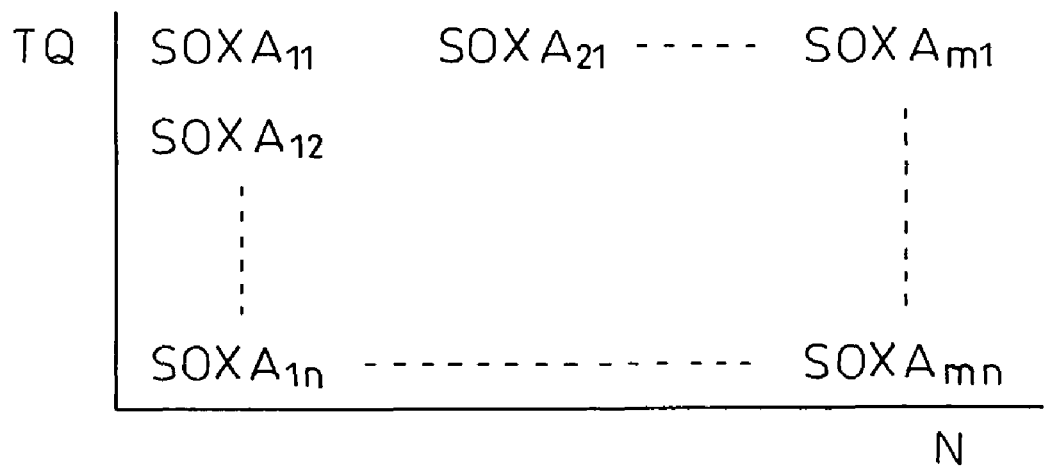

Referring to FIG. 6, first, at step 100, the $NO_x$ amount NOXA stored in the $NO_x$ storage catalyst 14 per unit time is calculated. This $NO_x$ amount NOXA is stored as a function of the required torque TQ and engine speed N in the form of the map shown in FIG. 7(A) in advance in the ROM 32. Next, at step 101, this NOXA is added to the $NO_x$ amount $\Sigma NOX$ stored in the $NO_x$ storage catalyst 14 whereby the $NO_x$ amount $\Sigma NOX$ stored in the $NO_x$ storage catalyst 14 is calculated. Next, at step 102, the $SO_x$ amount SOXA trapped by the $SO_x$ trap catalyst 12 per unit time is calculated. This $SO_x$ amount SOXA is also stored as a function of the required torque TQ and engine speed N in the form of a map such as shown in FIG. 7(B) in advance in the ROM 32. Next, at step 103, this SOXA is added to the $SO_x$ amount $\Sigma SOX$ trapped in the $NO_x$ storage catalyst 14.

Next, at step 104, it is judged if the stored $NO_x$ amount $\Sigma NOX$ has exceeded an allowable value NX. When $\Sigma NOX > NX$, the routine proceeds to step 105 where the target air-fuel ratio is calculated from the relationship shown in FIG. 5(A) based on the $SO_x$ trap amount $\Sigma SOX$ and the temperature of the $SO_x$ trap catalyst 12 detected by the temperature sensor 22. Next, at step 106, the amount of additional fuel for the combustion chamber 2 necessary for making the air-fuel ratio of the exhaust gas this target air-fuel ratio is calculated. Next, at step 107, the amount of fuel addition from the fuel addition valve 15 required for obtaining the predetermined rich air-fuel ratio is calculated. Next, at step 108, the supply of additional fuel and added fuel, that is, rich processing for switching the air-fuel ratio of the exhaust gas flowing into the $NO_x$ storage catalyst 14 temporarily from lean to rich, is performed and $\Sigma NOX$ is cleared.

Figure 8:
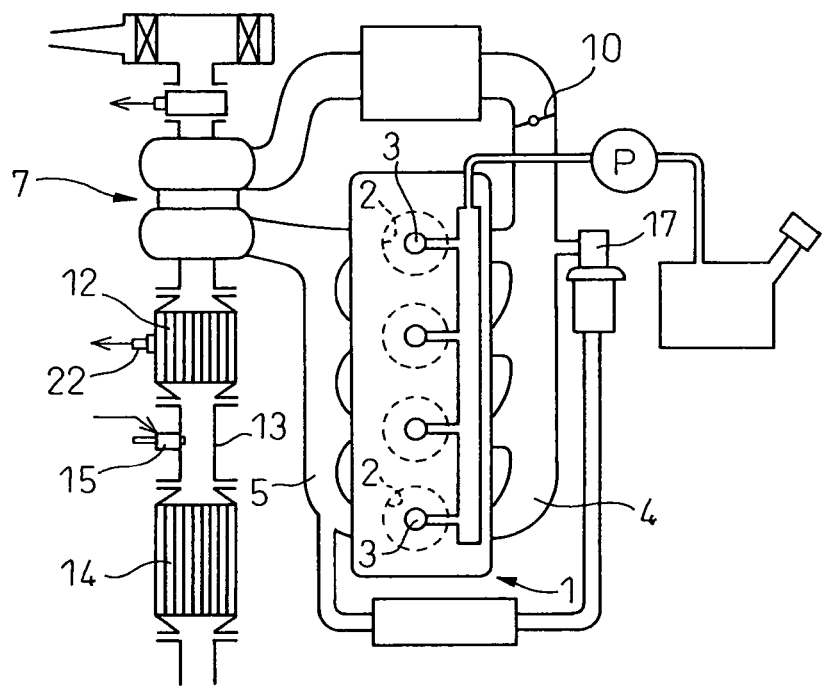
FIG. 8 is an overview of another embodiment of a compression ignition type internal combustion engine.

FIG. 8 shows another embodiment of a compression ignition type internal combustion engine. In this embodiment, the fuel addition valve 15 is arranged between the $SO_x$ trap catalyst 12 and the $NO_x$ storage catalyst 14. In this embodiment, different from the embodiment shown in FIG. 1, the fuel added from the fuel addition valve 15 is supplied to only the $NO_x$ storage catalyst 14 and is not supplied to the $SO_x$ trap catalyst 12. Therefore, in this embodiment, the air-fuel ratio of the exhaust gas exhausted from the combustion chamber 2 at the time of release of $NO_x$ becomes the same as the air-fuel ratio of the exhaust gas flowing into the $SO_x$ trap catalyst 12.

Figure 9:
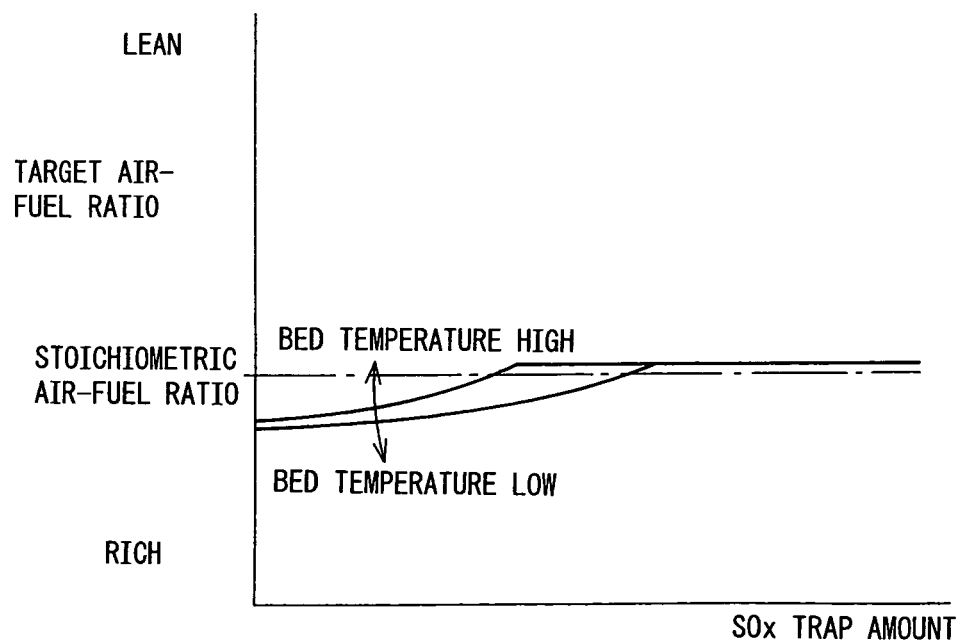
FIG. 9 is a view showing the target air-fuel ratio of the exhaust gas exhausted from a combustion chamber.

FIG. 9 shows the relationship between the target air-fuel ratio of the exhaust gas exhausted from the combustion chamber 2 and the $SO_x$ trap amount of the $SO_x$ trap catalyst 12 at the time of release of $NO_x$ in the case as shown in FIG. 8 where the fuel addition valve 15 is arranged downstream of the $SO_x$ trap catalyst 12. Note that in this embodiment as well, the target air-fuel ratio of the exhaust gas is made the smallest air-fuel ratio of the exhaust gas in the range where the $SO_x$ trap catalyst 12 does not release $SO_x$.

As will be understood from FIG. 9, in this embodiment as well, when the $SO_x$ trap amount is small, the target air-fuel ratio is made just slightly rich.

However, in this embodiment, the fuel added from the fuel addition valve 15 is not supplied to the $SO_x$ trap catalyst 12, so the target air-fuel ratio at this time becomes the rich side compared with the case shown in FIG. 5(A). Further, at this time, in this embodiment as well, the target air-fuel ratio is made larger the greater the $SO_x$ trap amount of the $SO_x$ trap catalyst 12. Further, the target air-fuel ratio is made larger the higher the temperature the $SO_x$ trap catalyst 12 becomes.

On the other hand, the $SO_x$ trap catalyst 12 does not release $SO_x$ so long as the air-fuel ratio of the exhaust gas flowing into the $SO_x$ trap catalyst 12 is lean. Therefore, in this embodiment, when the $SO_x$ trap amount increases, the target air-fuel ratio is maintained at a somewhat lean constant air-fuel ratio.

Next, the $SO_x$ trapping action by the $SO_x$ trap catalyst 12 at the time of release of $NO_x$ will be explained. If the $SO_x$ trapping ability falls at the time of release of $NO_x$, the $SO_x$ contained in the exhaust gas passes straight through the $SO_x$ trap catalyst 12 and therefore $SO_x$ ends up flowing into the $NO_x$ storage catalyst 14.

Therefore, to prevent $SO_x$ from flowing into the $NO_x$ storage catalyst 14 at the time of release of $NO_x$, it is necessary to prevent the release of $SO_x$ from the $SO_x$ trap catalyst 12 and also prevent the $SO_x$ trapping ability of the $SO_x$ trap catalyst 12 from falling.

Figure 10:
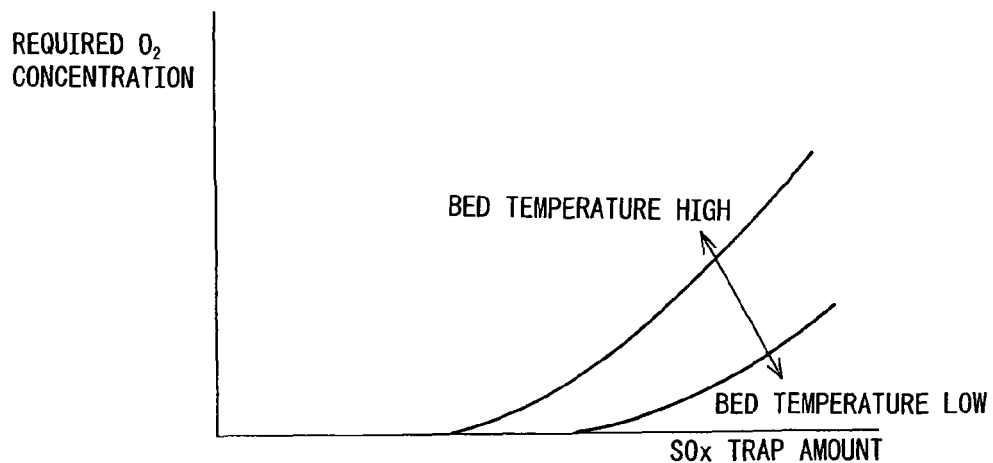
FIG. 10 is a view showing the target air-fuel ratio of the exhaust gas exhausted from the combustion chamber.
Figure 10:
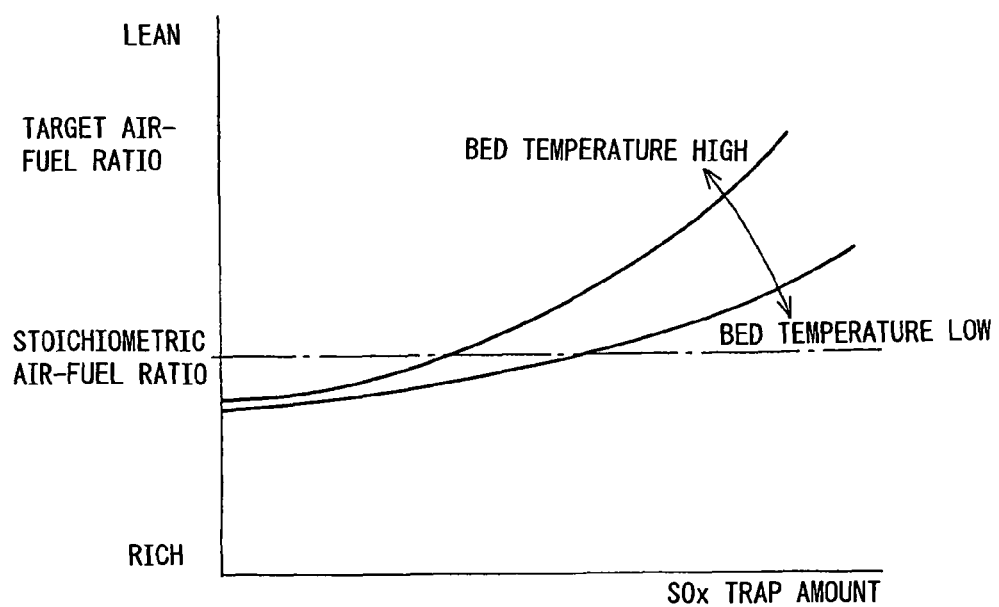

FIG. 10(A) shows the relationship between the oxygen concentration in the exhaust gas and the $SO_x$ trap amount of the $SO_x$ trap catalyst 12, which is required for obtaining more than a predetermined allowable level of, for example, more than a 95 percent, $SO_x$ trap rate. When the $SO_x$ trap amount is small, even if there is almost no oxygen present in the exhaust gas, the $SO_x$ in the exhaust gas is trapped by the $SO_x$ trap catalyst 12. However, if the $SO_x$ trap amount becomes greater, the basicity of the surface of the $SO_x$ trap catalyst 12 becomes weaker, so if there is no oxygen present in the exhaust gas, $SO_x$ is no longer trapped by the $SO_x$ trap catalyst 12.

Therefore, as shown in FIG. 10(A), the more the $SO_x$ trap amount increases, the higher the necessary oxygen concentration. Further, the more the bed temperature of the $SO_x$ trap catalyst 12 rises, the harder it is for the $SO_x$ to be trapped by the $SO_x$ trap catalyst 12. Therefore, as shown in FIG. 10(A), the oxygen concentration required for obtaining more than an allowable level of $SO_x$ trap rate is increased the higher the bed temperature the $SO_x$ trap catalyst 12 becomes.

Therefore, when trying to maintain the $SO_x$ trap rate at the time of release of $NO_x$ at more than an allowable level in the internal combustion engine shown in FIG. 8, the oxygen concentration in the exhaust gas exhausted from the combustion chamber 2 is controlled so that the oxygen concentration in the exhaust gas flowing into the $SO_x$ trap catalyst 12 becomes the oxygen concentration shown in FIG. 10(A).

FIG. 10(B) shows the relationship between the target air-fuel ratio of the exhaust gas exhausted from the combustion chamber and the $SO_x$ trap amount of the $SO_x$ trap catalyst 12 when preventing the release of $SO_x$ from the $SO_x$ trap catalyst while maintaining the $SO_x$ trap rate at more than an allowable level at the time of release of $NO_x$ in the case, as shown in FIG. 8, where a fuel addition valve 12 is arranged downstream of the $SO_x$ trap catalyst 12. In this way, when preventing the release of $SO_x$ from the $SO_x$ trap catalyst 12 while maintaining the $SO_x$ trap rate at more than an allowable level at the time of release of $NO_x$, as shown in FIG. 10(B), the target air-fuel ratio is made larger as the $SO_x$ trap amount increases.

LIST OF REFERENCE NUMERALS

4 . . . intake manifold
5 . . . exhaust manifold
7 . . . exhaust turbocharger
12 . . . $SO_x$ trap catalyst
14 . . . $NO_x$ storage catalyst
15 . . . fuel addition valve

The invention claimed is:

1. An exhaust purification device of an internal combustion engine, the exhaust purification device comprising:
an engine exhaust passage;
an $SO_x$ trap catalyst arranged in the engine exhaust passage, the $SO_x$ trap catalyst is capable of trapping $SO_x$ contained in exhaust gas;
an $NO_x$ storage catalyst arranged in the engine exhaust passage downstream of the $SO_x$ trap catalyst, the $NO_x$ storage catalyst is capable storing $NO_x$ contained in the exhaust gas when an air-fuel ratio of an inflowing exhaust gas is lean and capable of releasing a stored $NO_x$ when the air-fuel ratio of the inflowing exhaust gas becomes the stoichiometric air-fuel ratio or rich;

a fuel addition valve arranged in the engine exhaust passage upstream of the $NO_x$ storage catalyst; and a control unit that is programmed such that, when making the air-fuel ratio of the exhaust gas flowing into the $NO_x$ storage catalyst the stoichiometric air-fuel ratio or rich to make the NOx storage catalyst release the NOx, an additional fuel is fed into the combustion chamber and a fuel is added from the fuel addition valve, and at this time:

the amount of additional fuel to the combustion chamber and the amount of added fuel from the fuel addition valve are controlled so that the air-fuel ratio of the exhaust gas exhausted from the combustion chamber becomes the smallest in the range where the $SO_x$ trap catalyst does not release $SO_x$; and when a $SO_x$ trap amount of the $SO_x$ trap catalyst is below a predetermined value, the air-fuel ratio of the exhaust gas exhausted from the combustion chamber is made slightly rich.

2. An exhaust purification device of an internal combustion engine as set forth in claim 1, wherein when said additional fuel is supplied, the air-fuel ratio of the exhaust gas exhausted from the combustion chamber is made larger the greater the $SO_x$ trap amount of the $SO_x$ trap catalyst.

3. An exhaust purification device of an internal combustion engine as set forth in claim 1, wherein when said additional fuel is supplied, the air-fuel ratio of the exhaust gas exhausted from the combustion chamber is made larger the higher the temperature of the $SO_x$ trap catalyst.

4. An exhaust purification device of an internal combustion engine as set forth in claim 1, wherein a ratio of the amount of added fuel to the sum of the amount of additional fuel and the amount of added fuel is increased the greater the $SO_x$ trap amount of the $SO_x$ trap catalyst.

5. An exhaust purification device of an internal combustion engine as set forth in claim 1, wherein the air-fuel ratio of the exhaust gas exhausted from the combustion chamber is made larger the greater the $SO_x$ trap amount of the $SO_x$ trap catalyst so that more than a predetermined allowable level of $SO_x$ trap rate is obtained when $NO_x$ should be released from the $NO_x$ storage catalyst.

6. An exhaust purification device of an internal combustion engine as set forth in claim 1, wherein said fuel addition valve is arranged in the engine exhaust passage upstream of the $SO_x$ trap catalyst.

7. An exhaust purification device of an internal combustion engine as set forth in claim 1, wherein said fuel addition valve is arranged between the $SO_x$ trap catalyst and the $NO_x$ storage catalyst.

* * * * *